United States Patent
Yanagita

(12) 
(10) Patent No.: US 8,690,192 B2
(45) Date of Patent: Apr. 8, 2014

(54) SADDLE RIDING VEHICLE

(75) Inventor: Kiyoshi Yanagita, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 16 days.

(21) Appl. No.: 13/311,479

(22) Filed: Dec. 5, 2011

(65) Prior Publication Data

US 2012/0139226 A1 Jun. 7, 2012

(30) Foreign Application Priority Data

Dec. 7, 2010 (JP) ................................. 2010-272845

(51) Int. Cl.
*B62D 25/18* (2006.01)

(52) U.S. Cl.
USPC ......... 280/851; 180/68.1; 180/68.3; 180/219; 180/296; 60/298

(58) Field of Classification Search
USPC ........................................................ 180/296
See application file for complete search history.

(56) References Cited

U.S. PATENT DOCUMENTS

2008/0135317 A1* 6/2008 Kajiwara et al. ............. 180/68.1
2008/0236783 A1* 10/2008 Morita et al. .................. 165/41

FOREIGN PATENT DOCUMENTS

| EP | 1933010 | 6/2008 |
|----|---------|--------|
| JP | 60-088818 | 5/1985 |
| JP | 05-124561 | 5/1993 |
| JP | 2002-264875 | 9/2002 |
| JP | 2005-220814 | 8/2005 |
| JP | 2005-240711 | 9/2005 |
| JP | 2006-027397 | 2/2006 |
| JP | 2007-008276 | 1/2007 |
| JP | 2007-040250 | 2/2007 |
| JP | 2009-035108 | 2/2009 |

OTHER PUBLICATIONS

Extended European Search Report for corresponding EP Application No. 11190328.2-1254, Feb. 6, 2012.
European Office Action for corresponding EP Application No. 11190328.2-1254, Jan. 29, 2013.
Japanese Office Action for corresponding JP Application No. 2010-272845, Apr. 18, 2013.

* cited by examiner

Primary Examiner — J. Allen Shriver, II
Assistant Examiner — Hilary L Johns
(74) Attorney, Agent, or Firm — Ditthavong Mori & Steiner, P.C.

(57) ABSTRACT

A saddle riding vehicle includes a vehicle body frame, an engine, a catalytic device, and a catalyst cover. The engine is disposed on the vehicle body frame and includes a cylinder block in a forwardly inclined position. The catalytic device is disposed at a front lower portion of the engine. The catalytic device includes an exhaust gas introducer oriented substantially at right angles, and a catalyst case disposed below the exhaust gas introducer. The catalyst cover is disposed on the vehicle body frame to cover a front portion of the catalytic device from a front downward direction. The catalyst cover is provided in a space between the catalytic device and a front wheel supported by a front fork provided at a front side of the vehicle body frame. The catalyst cover includes an opening portion at a forward portion of the exhaust gas introducer.

7 Claims, 19 Drawing Sheets

SADDLE RIDING VEHICLE

CROSS-REFERENCE TO RELATED APPLICATIONS

The present application claims priority under 35 U.S.C. §119 to Japanese Patent Application No. 2010-272845, filed Dec. 7, 2010. The contents of this application are incorporated herein by reference in their entirety.

BACKGROUND OF THE INVENTION

1. Field of the Invention

The present invention relates to saddle riding vehicles.

2. Discussion of the Background

Motorcycles have engine sections disposed at downward portions thereof. Typically, such a motorcycle is structured to protect the engine with a cover member as appropriately. For example, Japanese Patent Laid-open No. 2006-027397 discloses an under cover structure for a motorcycle including a horizontal cylinder and an exhaust pipe extending rearwardly from a lower portion of the engine. The structure includes an under cover disposed so as to cover an area downward of the engine and a front portion of the exhaust pipe and a mud cover covering a front surface of the engine. This structure can protect the lower portion of the engine and the front portion of the exhaust pipe from splashing mud and flying gravel.

Some other motorcycles include exhaust gas purification devices. One type of such an exhaust gas purification device is disclosed, for example, in Japanese Patent Laid-open No. 2005-240711. Japanese Patent Laid-open No. 2005-240711 discloses an engine exhaust gas purification device, in which a catalytic device is connected to an exhaust port, the catalyst includes an exhaust gas introducing section oriented substantially at right angles, and a catalyst case is connected immediately below the exhaust gas introducing section. Such a structure allows the catalyst to be quickly activated during cold starting and an exhaust gas discharged from the exhaust port to be blown perpendicularly against a wall of the exhaust gas introducing section. The exhaust gas can thereby be inhibited from flowing along an outside of a pipe, so that a uniform flow of the gas can be ensured relative to the catalyst.

SUMMARY OF THE INVENTION

According to one aspect of the present invention, a saddle riding vehicle comprises a vehicle body frame, an engine, a catalytic device, and a catalyst cover. The engine is disposed on the vehicle body frame and includes a cylinder block in a forwardly inclined position. The catalytic device is disposed at a front lower portion of the engine. The catalytic device comprises an exhaust gas introducer oriented substantially at right angles, and a catalyst case disposed below the exhaust gas introducer. The catalyst cover is disposed on the vehicle body frame to cover a front portion of the catalytic device from a front downward direction. The catalyst cover is provided in a space between the catalytic device and a front wheel supported by a front fork provided at a front side of the vehicle body frame. The catalyst cover includes an opening portion at a forward portion of the exhaust gas introducer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
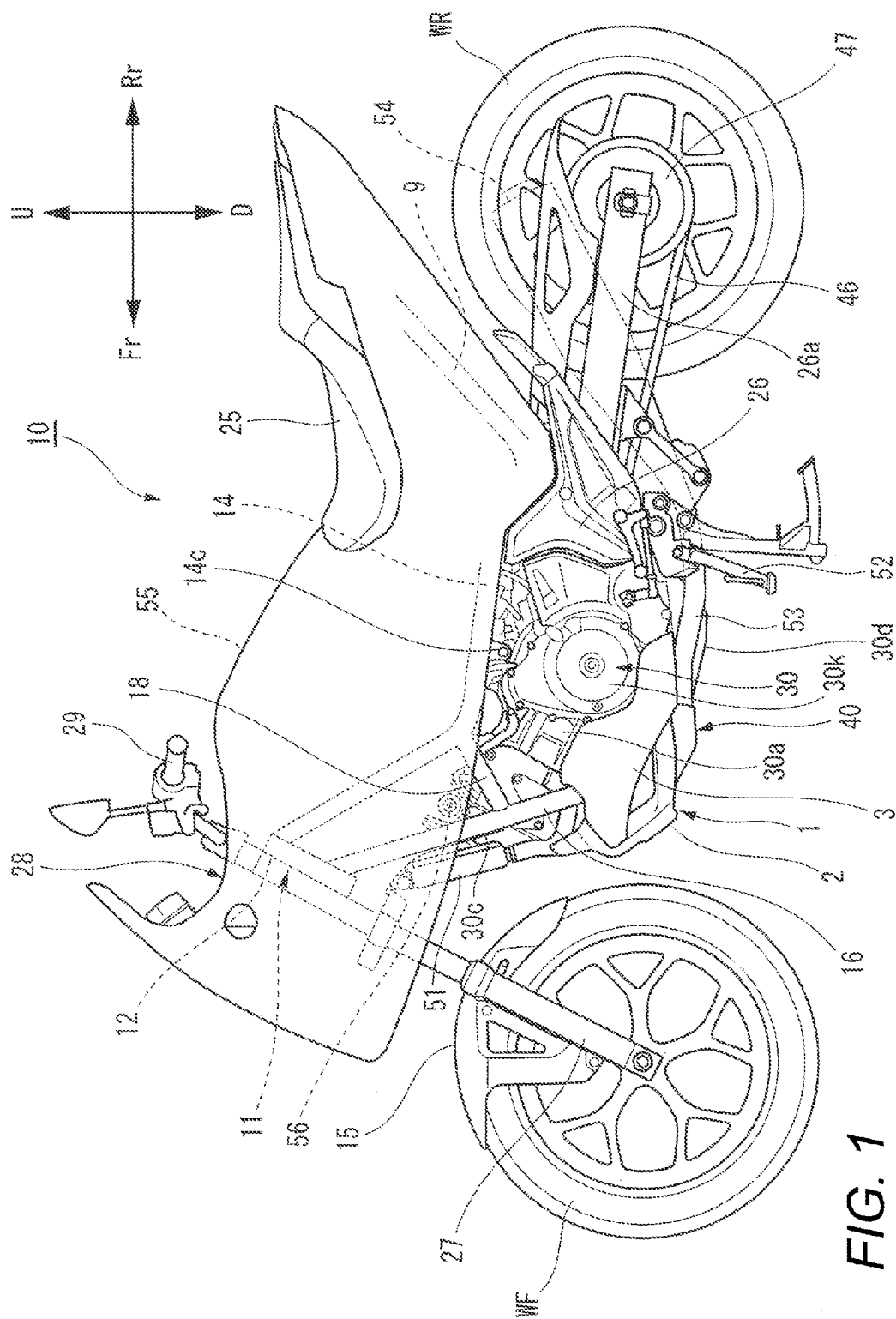
FIG. 1 is a left side elevational view showing a saddle riding vehicle according to an embodiment of the present invention.

The embodiments will now be described with reference to the accompanying drawings, wherein like reference numerals designate corresponding or identical elements throughout the various drawings.

The drawings should be viewed in the direction of reference numerals. Throughout the descriptions given hereunder, longitudinal, lateral, and vertical directions are relative to a vehicle operator. In the drawings, an arrow Fr denotes a vehicle forward direction, an arrow Rr denotes a vehicle rightward direction, an arrow L denotes a left side of the vehicle, an arrow R denotes a right side of the vehicle, an arrow U denotes a vehicle upward direction, and an arrow D denotes a vehicle downward direction, respectively.

General arrangements of a motorcycle 10 according to the embodiment of the present invention will be described below with reference to FIG. 1.

Referring to FIG. 1, the motorcycle 10 includes an engine 30 disposed at a substantially center downward side of thereof. The engine 30 is appropriately supported by a vehicle body frame 11 which is covered in a vehicle body cover 28 formed of a synthetic resin.

The vehicle body frame 11 includes a head pipe 12, a pair of left and right center frames 14, and a pair of left and right down frames 16. Specifically, the head pipe 12 is disposed at a front end of the vehicle body frame 11. The center frames 14 extend obliquely downwardly toward the rear from upper portions at left and right of the head pipe 12. The center frames 14 then extend rearwardly substantially horizontally and are bent rearwardly in a protruding condition before extending downwardly. The down frames 16 extend obliquely downwardly toward the rear from lower portions at left and right of the head pipe 12.

The vehicle body frame 11 further includes a pair of left and right seat stays 9, a pair of left and right middle frames, and related parts. Specifically, the seat stays 9 extend rearwardly from rear upper portions of the center frames 14 and have their rear portions joined together. The middle frames extend rearwardly from rear end portions of the center frames 14 and have their rear portions joined together.

The head pipe 12 supports a pair of left and right front forks 27 steerably in clockwise and counterclockwise directions. The front forks 27 extend downwardly and have their lower ends journaling a front wheel WF. A steering handlebar 29 is connected to upper portions of the front forks 27.

A pivot plate 26 is disposed on the center frames 14 at a rearward portion side of the engine 30. A rear fork 26a has a front end rotatably supported on the pivot plate 26 via a pivot bolt not shown. The rear fork 26a has a rear end journaling a rear wheel WR. The rear fork 26a is vertically swingably supported via a rear cushion not shown.

An occupant seat 25 that integrates a rider seat with a pillion seat is disposed upwardly of the pair of left and right seat stays 9.

Though not shown in FIG. 1, a fuel tank is disposed between rear portions of the vehicle body frame 11 (between the seat stays 9 and the middle frames). Additionally, a storage box 55 having a large capacity to store, for example, a full-face helmet is disposed forwardly of the occupant seat 25.

Additionally, a reinforcement frame 18 is disposed so as to connect between the center frame 14 and the down frame 16.

In this embodiment, the engine 30 is supported on the center frames 14 and the down frames 16. The engine 30 is a water-cooled, parallel two-cylinder engine. The engine 30 includes a cylinder block portion 30a disposed in a forwardly inclined position on a side forward of a crankcase 30k.

The engine 30 is supported as follows. Specifically, the crankcase 30k has an upper portion supported by engine hanger portions 14c of the left and right center frames 14. The cylinder block portion 30a has a lower end supported by engine hanger portions 17 (see FIG. 2) at lower ends of the left and right down frames 16.

The cylinder block portion 30a includes, for example, an ignition plug (in FIG. 4, a plug cap 35 is shown) disposed at an upper portion of a cylinder head 30c that is connected to an upper portion of the cylinder block portion 30a. An oil pan 30d is connected to a lower end portion of the crankcase 30k. In addition, a radiator 51 is disposed forwardly of a cylinder head cover. A side stand 52 is fitted to the vehicle body frame 11.

A rotational driving force outputted from the engine 30 is transmitted to the rear wheel WR via a drive sprocket mounted on an output shaft, not shown, disposed in a protruding condition on a rear portion left side surface of the crankcase 30k, a driven sprocket 47 mounted on the rear wheel WR, and a drive chain 46 trained over the two sprockets.

In this embodiment, an exhaust pipe 53 and a muffler 54 that constitute an engine exhaust system are connected in sequence to, and a catalytic device 40 to be described later is disposed at, an exhaust manifold section formed at a front surface of the cylinder head 30c.

In addition, a throttle body 56 and an air cleaner device that constitute an engine intake system are connected in sequence to an intake manifold section formed at a back surface of the cylinder head 30c.

In the motorcycle 10 of this embodiment as arranged as described above, the catalytic device 40 is connected to the exhaust system. The catalytic device 40 will be described with reference to FIG. 19.

Figure 19:
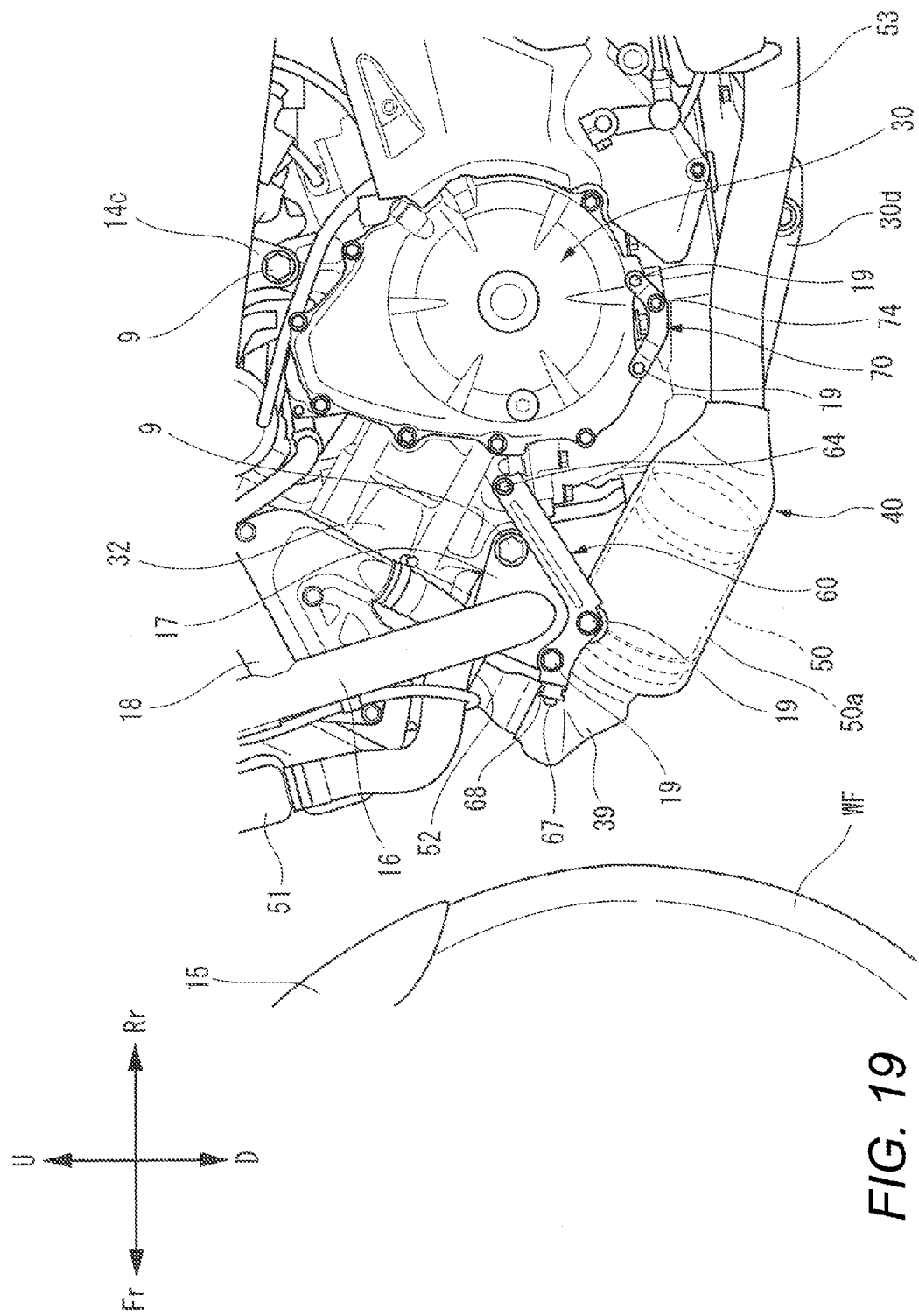
FIG. 19 is an enlarged side elevational view showing a main section of the vehicle before the catalyst cover according to the embodiment of the present invention is mounted.

As shown in FIG. 19, the catalytic device 40 is disposed at a front lower portion of the engine 30. The catalytic device 40 includes an exhaust gas introducing section 39 that is oriented substantially at right angles with an orientation of an exhaust port outlet 52 of the engine 30. A catalyst case accommodating section 50a having a diameter larger than a diameter of the exhaust gas introducing section 39 is disposed immediately below the exhaust gas introducing section 39. A catalyst case 50 is disposed inside the catalyst case accommodating section 50a. The exhaust pipe 53 is connected downstream of the catalyst case accommodating section 50a.

An exhaust gas discharged from the exhaust port outlet 52 is therefore introduced into the catalyst case 50, while being agitated by a sharp flow path bend at the exhaust gas introducing section 39, so that an exhaust gas flow can be avoided from being biased and an effective catalytic reaction can be expected.

Figure 2:
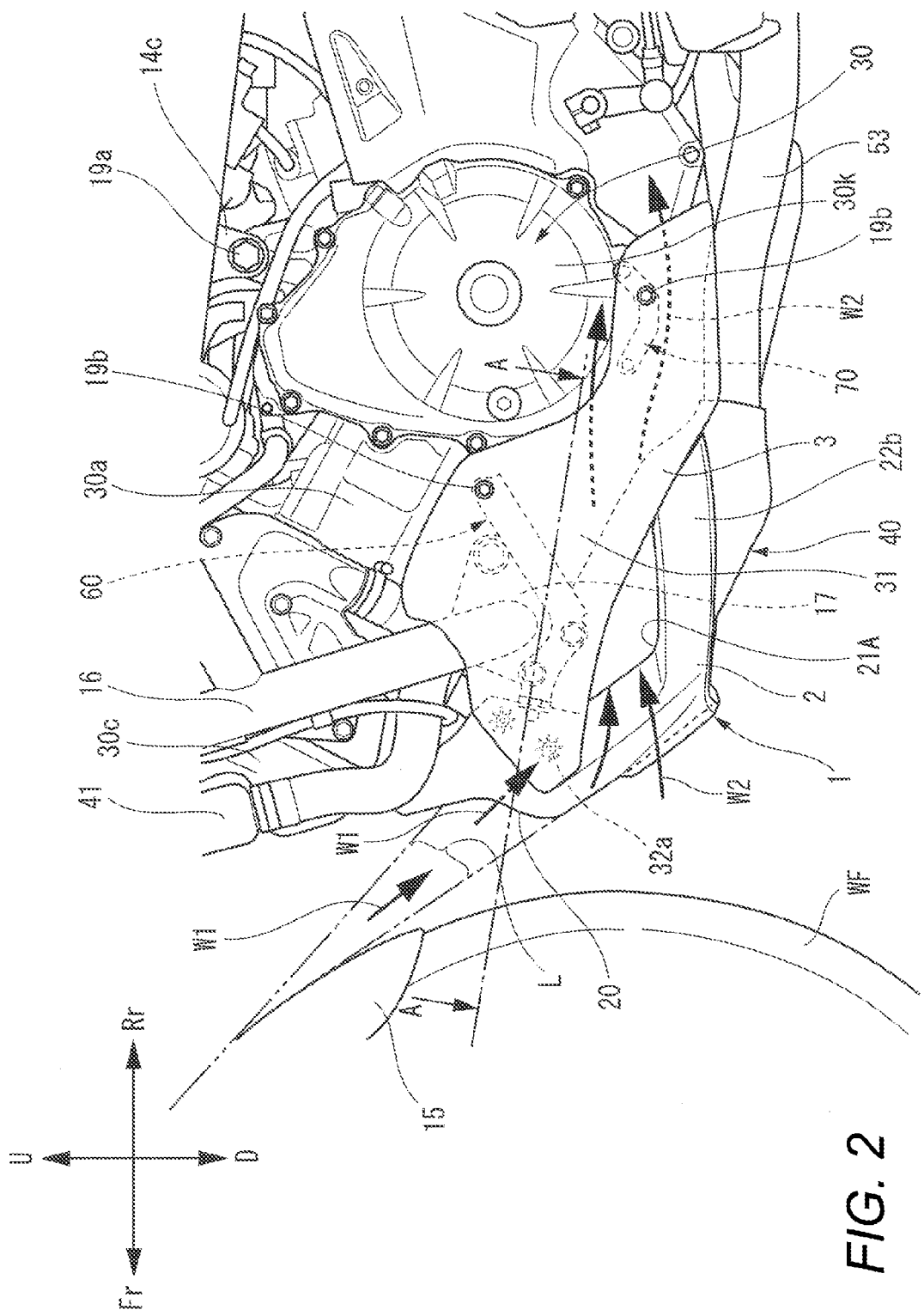
FIG. 2 is an enlarged left side elevational view showing a section at which a catalyst cover covering a catalytic device in the saddle riding vehicle shown in FIG. 1.

Referring to FIGS. 1 and 2, this embodiment includes a catalyst cover 1 that is arranged so as to cover appropriately forward and downward sides of the engine 30 including the catalytic device 40. The catalyst cover 1 in this embodiment is further structured to include an opening portion 20 at a forward portion of the exhaust gas introducing section 39 that protrudes forwardly and downwardly of the engine 30.

Figure 3:
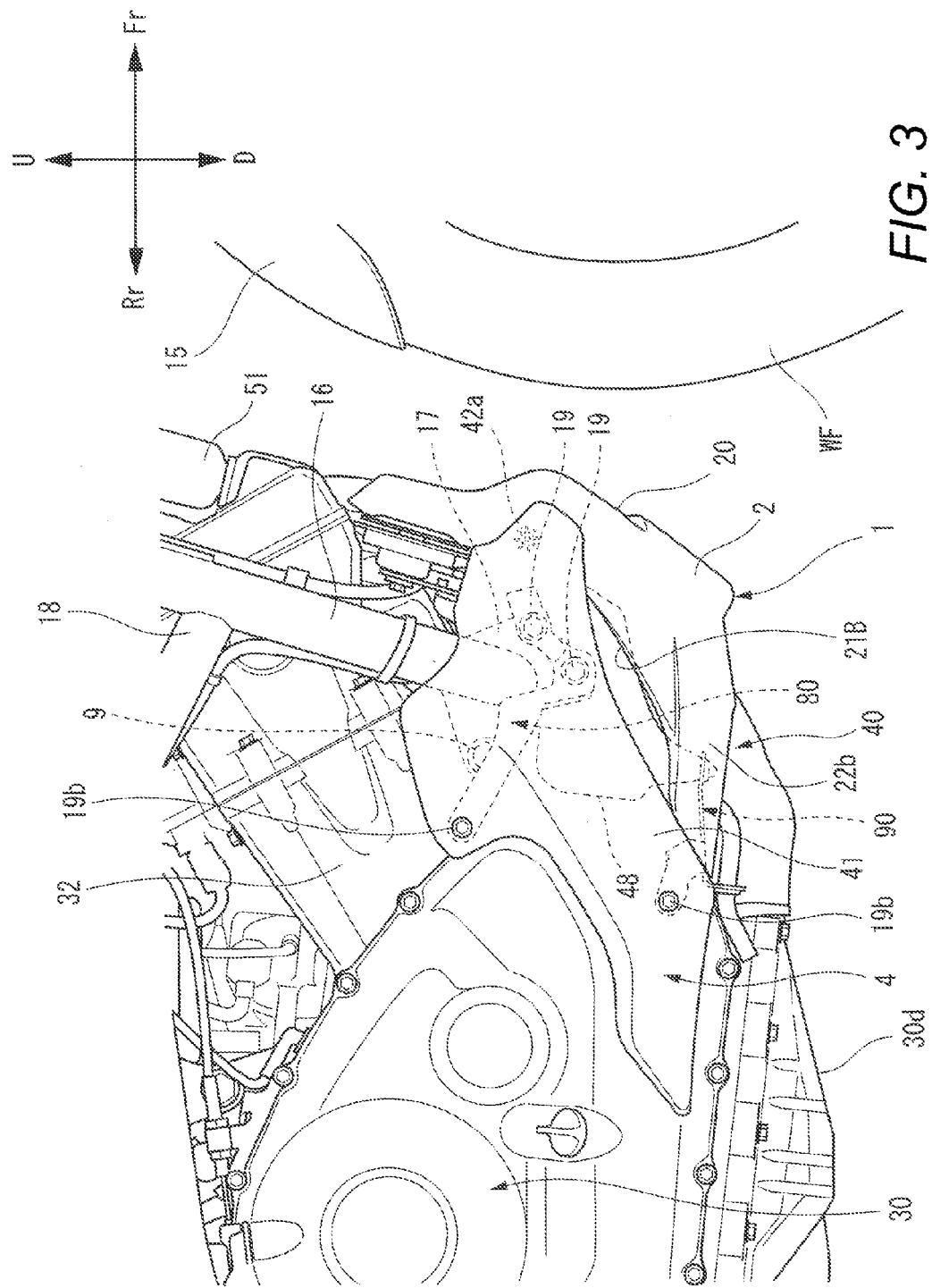
FIG. 3 is an enlarged right side elevational view showing the section at which the catalyst cover covering the catalytic device in the saddle riding vehicle shown in FIG. 1.
Figure 4:
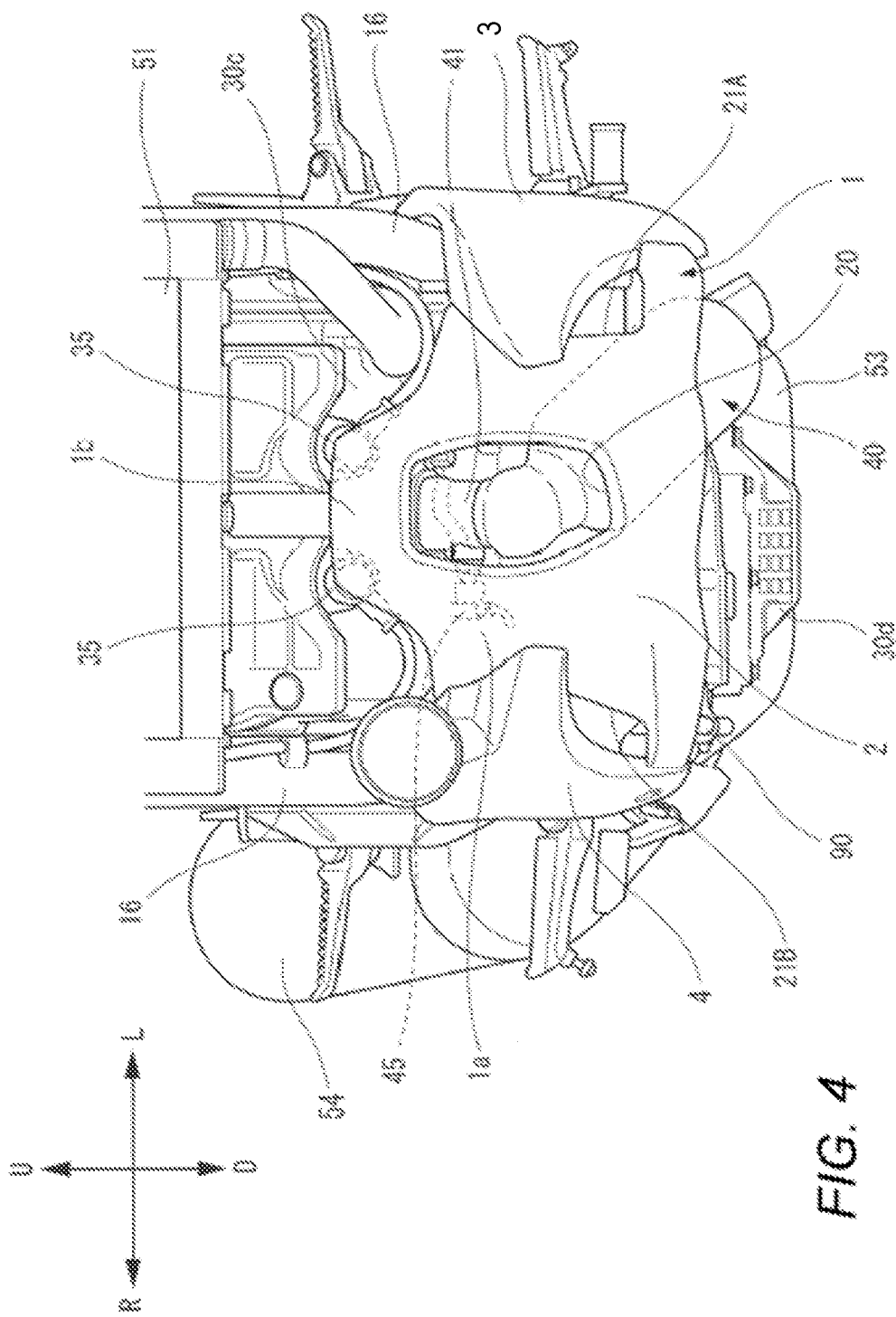
FIG. 4 is an enlarged front elevational view showing the section at which the catalyst cover covering the catalytic device in the saddle riding vehicle shown in FIG. 1, as viewed from the front of the vehicle.

Referring to FIGS. 2, 3, and 4, the catalyst cover 1 of this embodiment includes three parts, that is, a center cover 2, and a pair of left and right side covers 3, 4 assembled together.

Figure 10:
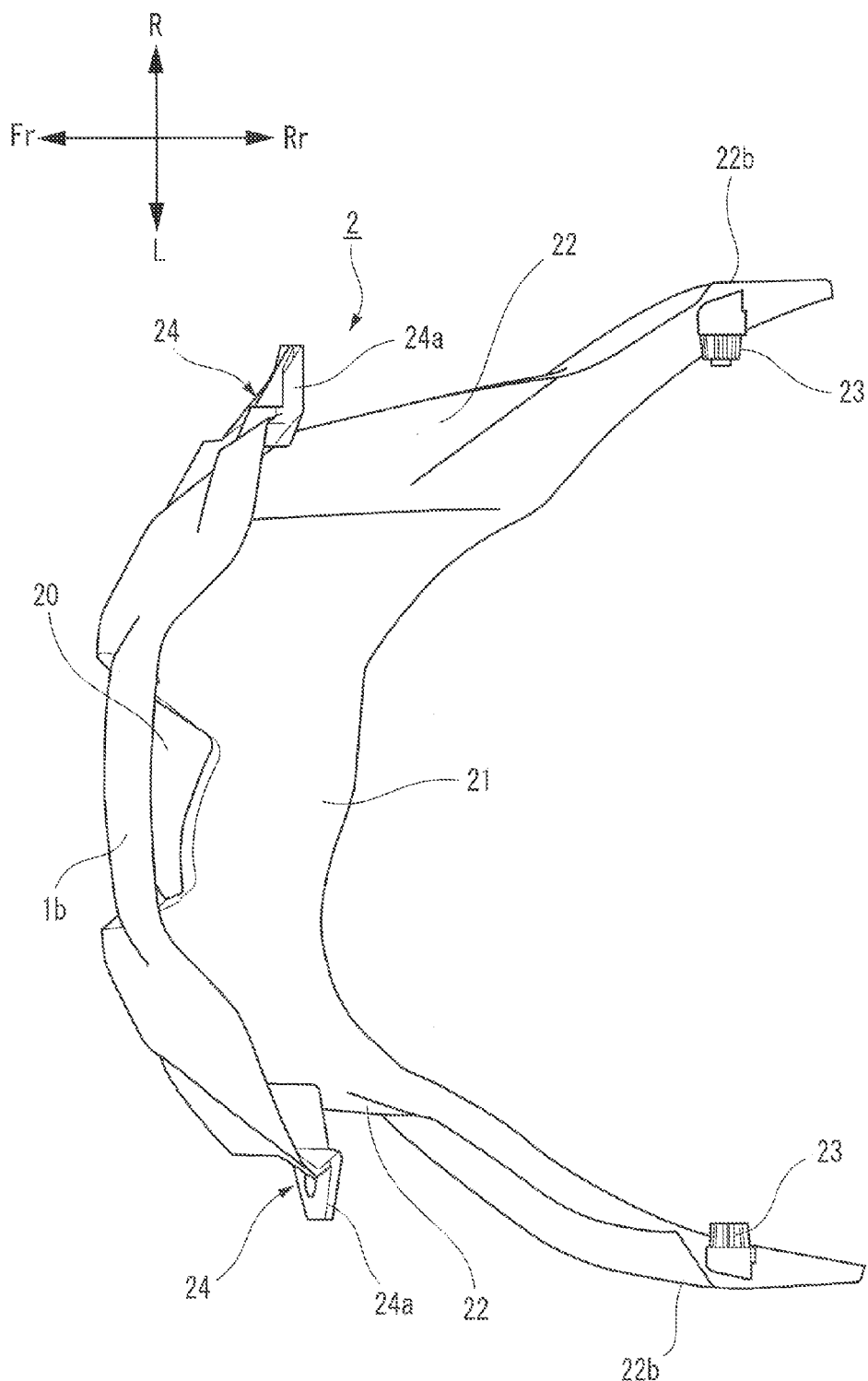
FIG. 10 is a plan view showing the center side cover in the catalyst cover according to the embodiment of the present invention.
Figure 11:
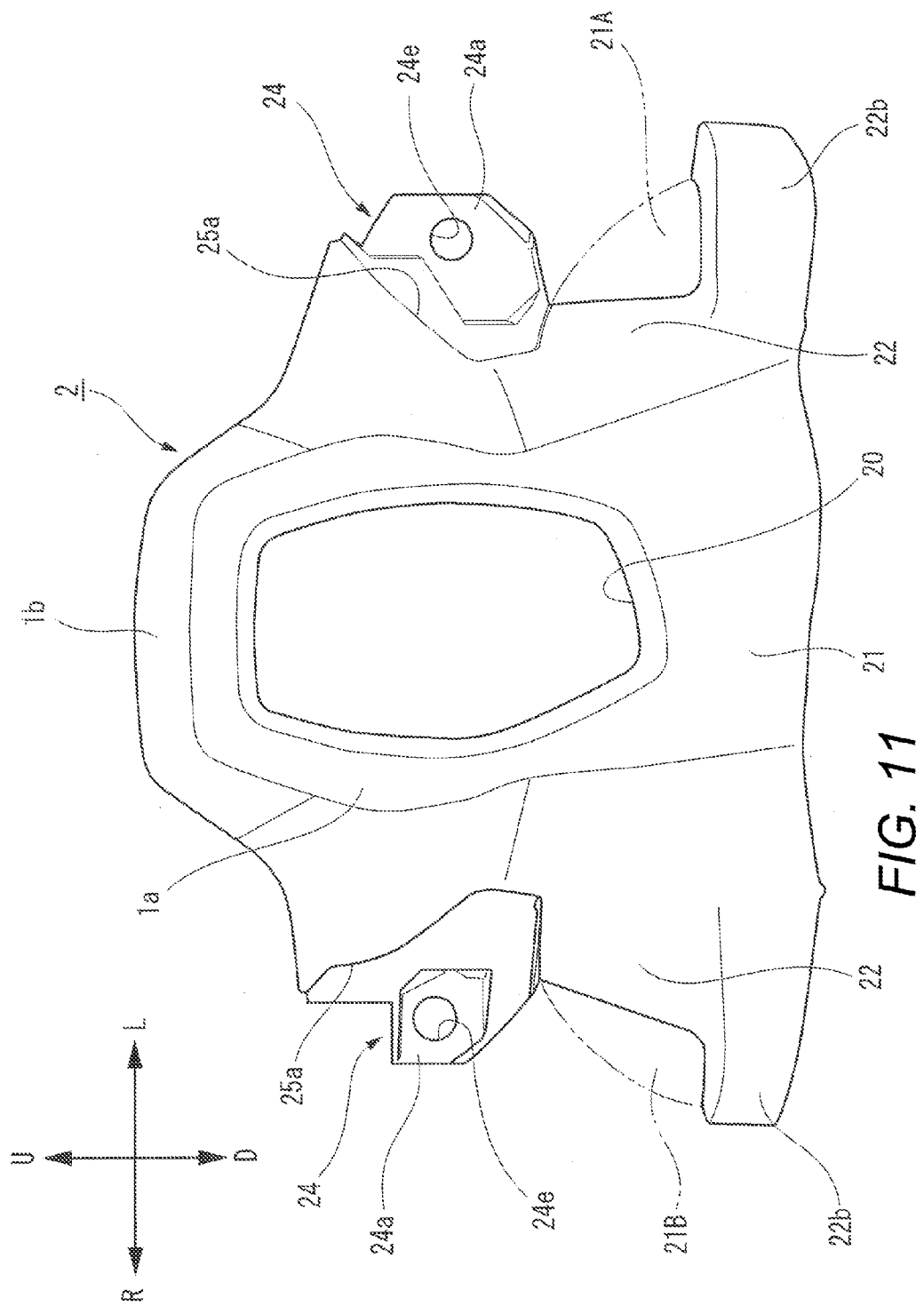
FIG. 11 is a front elevational view showing the center side cover in the catalyst cover according to the embodiment of the present invention.

As shown in FIG. 11 looking the center cover 2 from the front side and FIG. 10 looking the center cover 2 from the upward side, the center cover 2 includes the slightly vertically long opening portion 20 at a substantially central portion thereof. The center cover 2 includes a front surface upward wall on the upper side of the opening portion 20. The front surface upward wall is formed as a plug cover portion 1b that covers an area including a portion at which two ignition plugs (shown actually in FIG. 4 are plug caps 35 of the ignition plugs) are mounted. The center cover 2 also includes a front surface downward wall 21 disposed on the lower side of the opening portion 20. The front surface downward wall 21 is curved appropriately so as to cover a forward lower end of the engine 30 and a front surface and part of a lower surface of the catalytic device 40.

The center cover 2 further includes side downward walls 22b, 22b that bulge to either lateral side of lower ends of the front surface downward wall 21. The side downward walls 22b, 22b cover a downward side portion of the cylinder block 30a, side surfaces of the catalytic device 40, and a front surface and a lower end of a radiator reservoir tank 48.

It is to be noted that the center cover 2 is asymmetrically shaped in a vehicle body lateral direction because of structures surrounding the engine 30 in the vehicle lateral direction being slightly different from each other.

Figure 5:
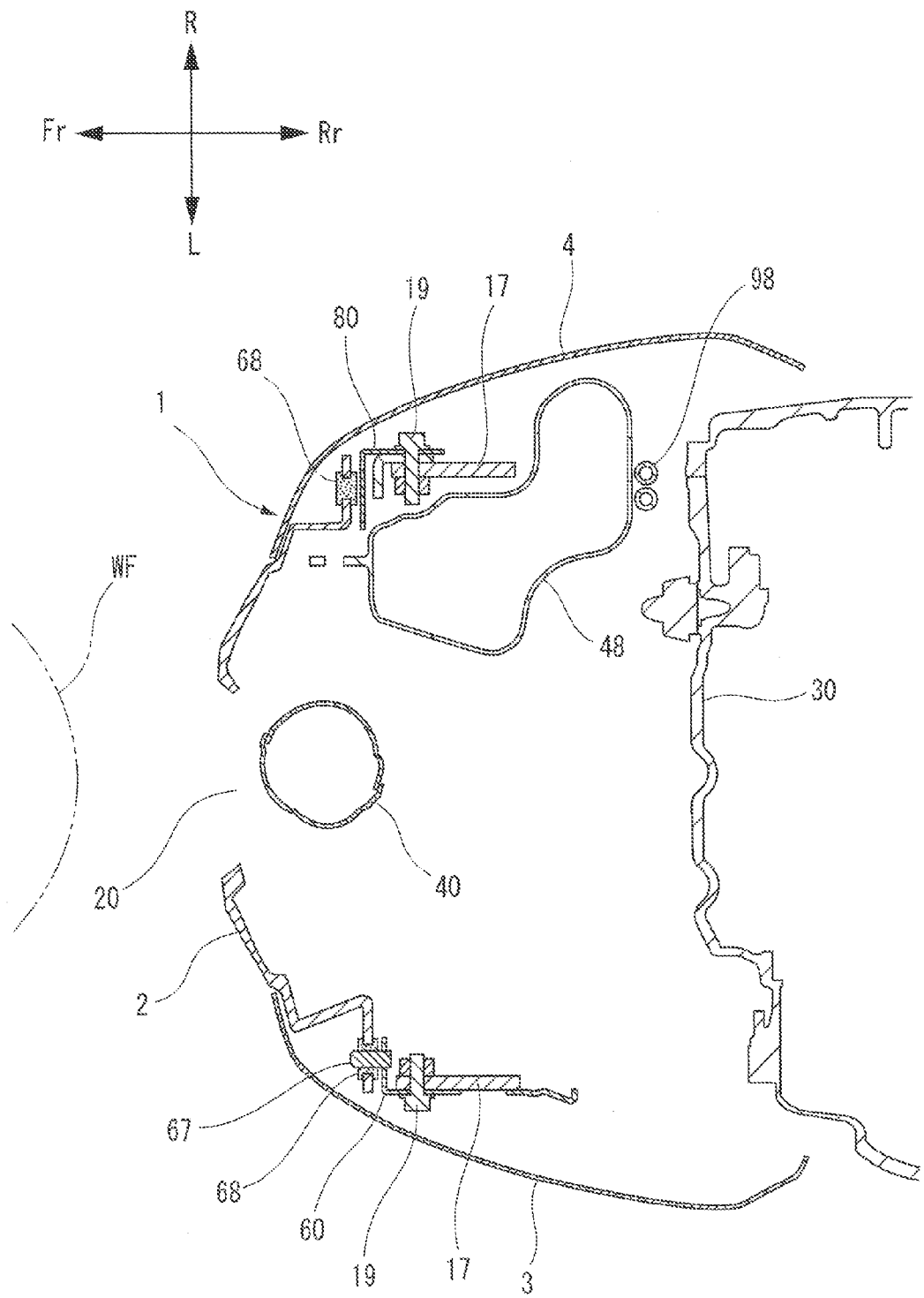
FIG. 5 is an end view of a cross section taken along line A-A in FIG. 2.

Referring to FIG. 5, the catalyst cover 1 of this embodiment covers substantially all spaces of a forward downward portion and forward downward side surface portions of the engine 30. Additionally, the opening portion 20 in the catalyst cover 1 is disposed at a position facing the front wheel WF. Such arrangements allow effects to be described later to be achieved.

Figure 9:
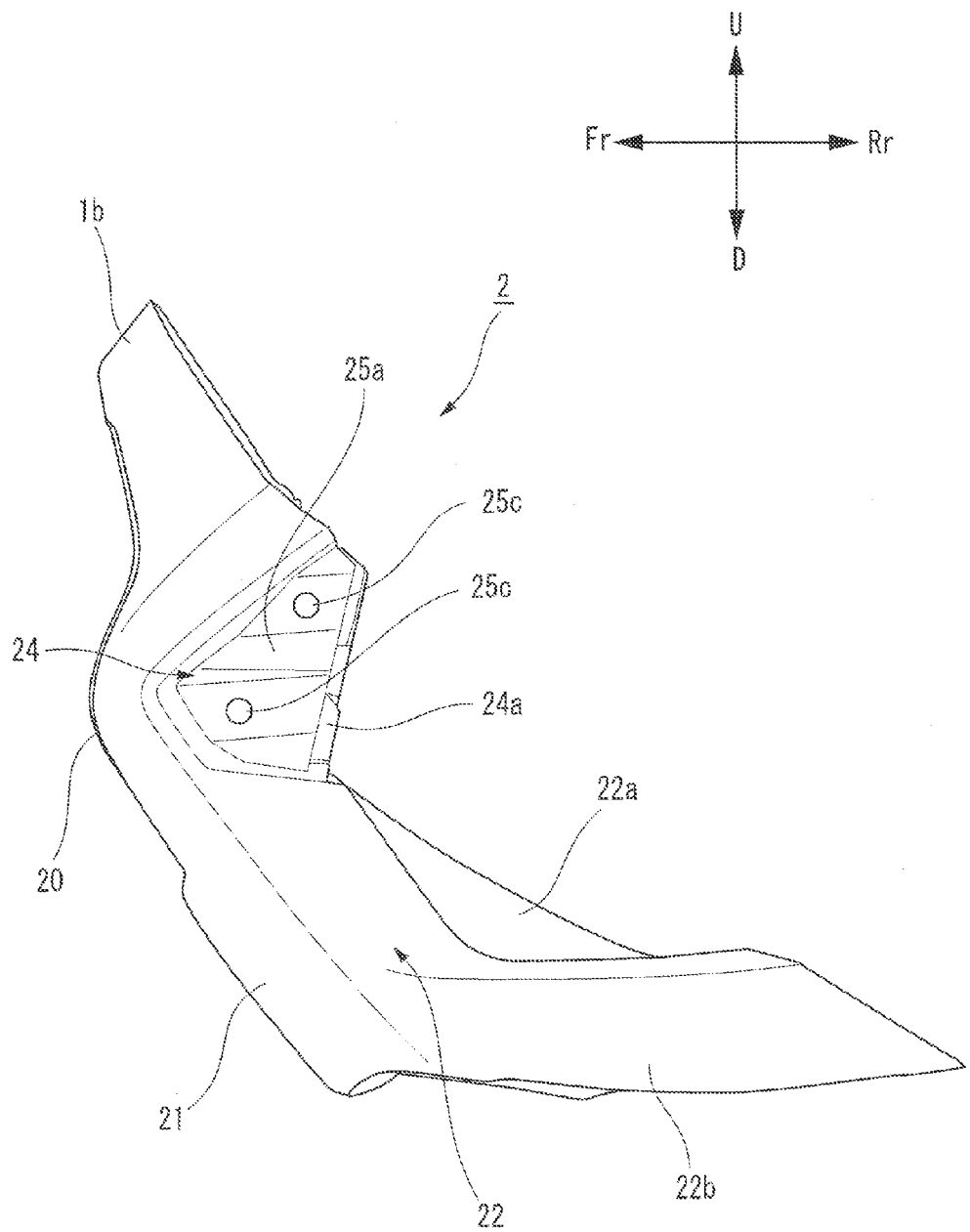
FIG. 9 is a side elevational view showing a center side cover in the catalyst cover according to the embodiment of the present invention.

The center cover 2 includes connecting and fixing portions 24, 24 on either lateral side of the opening portion 20. The connecting and fixing portions 24, 24 are connected to the side covers 3, 4 and fixed to the vehicle body. Referring to FIG. 9, the connecting and fixing portion 24 has a connecting surface 25a extending in a vehicle body longitudinal direction and a fixing portion 24a (see FIG. 10) extending in a vehicle body lateral direction. The connecting surface 25a has connecting holes 25c, 25c in which to fit fitting bosses of the side covers 3 and 4 to be described later. The fixing portion 24a has a fixing hole 24e in which to fit mounting stays 60 and 80 to be described later.

A center cover side wall 22 below each of the connecting and fixing portions 24, 24 is curved toward the vehicle body rearward side so as to approach the cylinder block 30a. In addition, a hole portion entrance wall 22a that forms part of air hole portions 21A and 21B to be described later is disposed at a portion of the center cover side wall 22 on the vehicle body rearward side.

Figure 6:
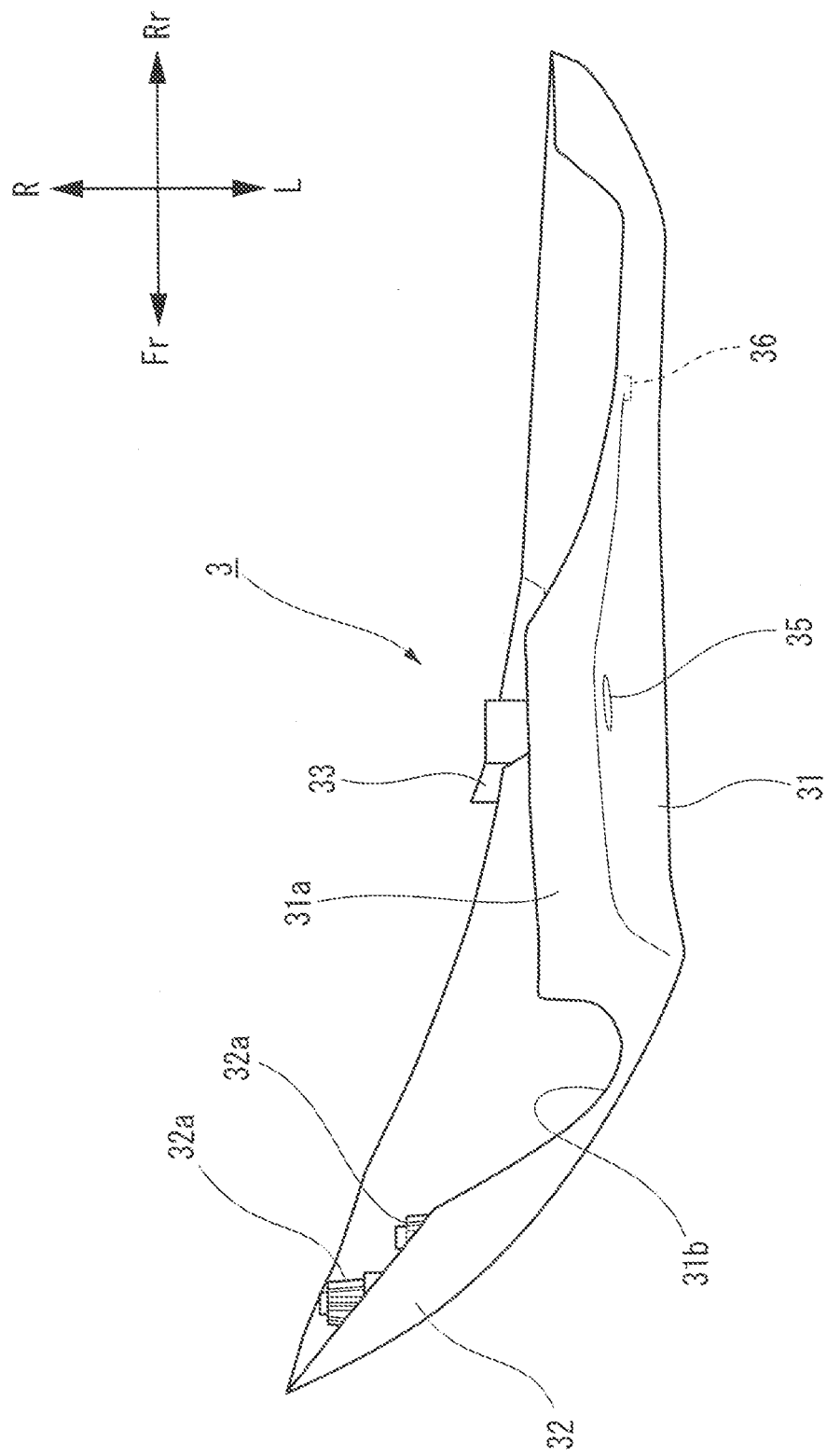
FIG. 6 is a plan view showing a left side cover in the catalyst cover according to the embodiment of the present invention.
Figure 7:
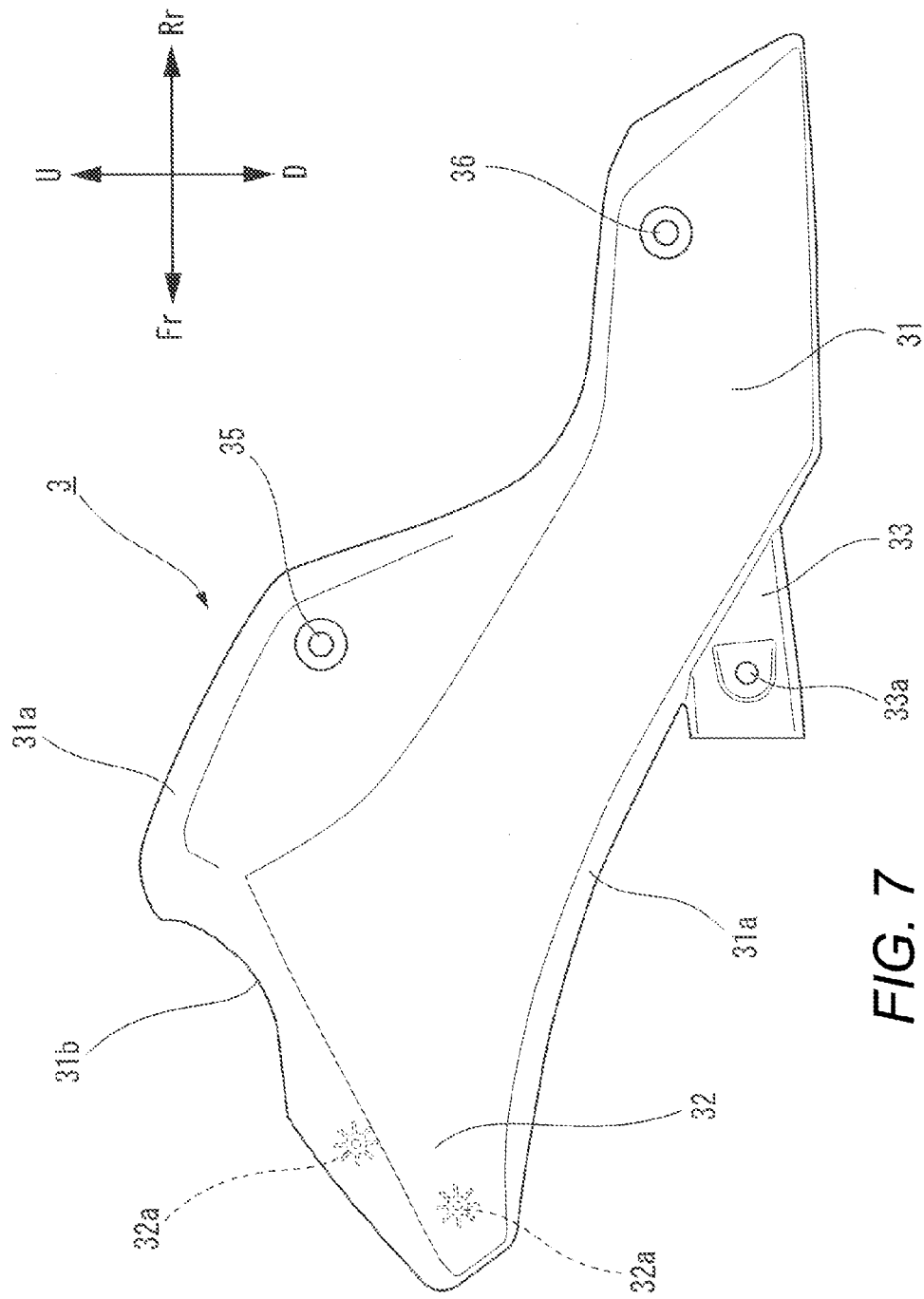
FIG. 7 is a side elevational view showing the left side cover in the catalyst cover according to the embodiment of the present invention.
Figure 8:
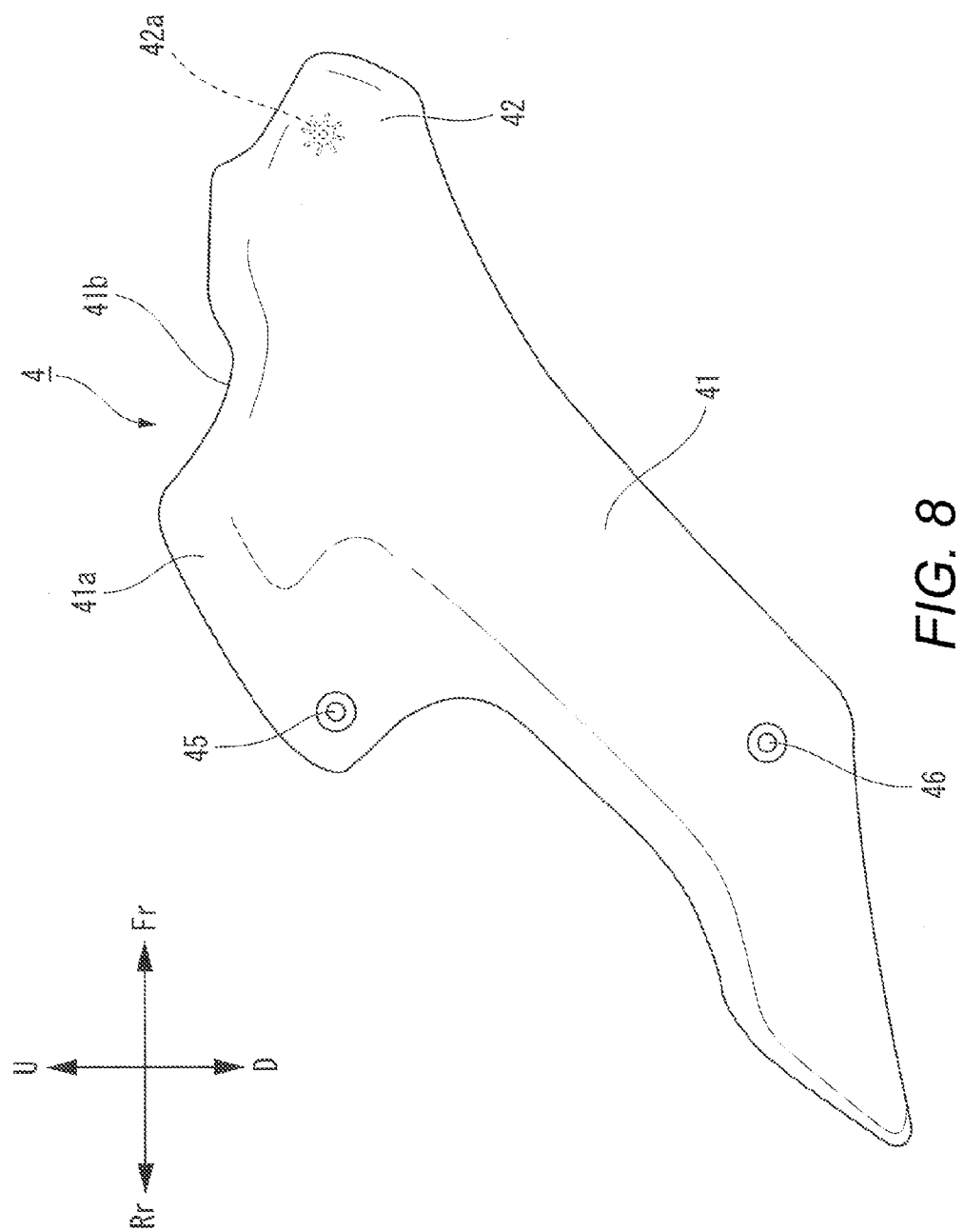
FIG. 8 is a side elevational view showing a right side cover in the catalyst cover according to the embodiment of the present invention.

Referring to FIG. 2, the side cover 3 on the left side of the vehicle body is formed with a side wall surface 31 covering left sides of the cylinder block 30a and the crankcase 30k. As shown in FIGS. 6 and 7, the side wall surface 31 is shaped to include an edge portion 31a having an outer peripheral edge curved to rise toward the side of the engine 30.

The side wall surface 31 includes a forward connecting portion 32 and a downward connecting portion 33. Specifically, the forward connecting portion 32 is disposed on the vehicle body forward side of the side wall surface 31 and has a pair of fitting bosses 32a, 32a. The downward connecting portion 33 is disposed at a substantially intermediate position in the vehicle body longitudinal direction on a downward side of the side wall surface 31 and has a connecting hole 33a that permits connection to the center cover 2.

The side cover 3 is integrated with the center cover 2 as follows. Specifically, the pair of fitting bosses 32a, 32a is fitted into the connecting holes 25c, 25c and a fitting boss 23a of the center cover 2 is fitted into the connecting hole 33a.

The side wall surface 31 further has fixing holes 35, 36 made at upper and lower positions along an edge of the side wall surface 31 on the vehicle body rearward side. Additionally, the edge portion 31a on the upper edge has a curved portion 31b that is curved to follow appropriately an outline of the down frame 16.

Referring to FIGS. 3 and 4, the side cover 4 on the right side of the vehicle body is formed with a side wall surface 41 covering right sides of forward and downward portions of the engine 30.

In the same manner as with the above-described side cover 3, the side wall surface 41 is shaped to include an edge portion 41a having an outer peripheral edge curved to rise toward the side of the engine 30. The side wall surface 41 further includes a forward connecting portion 42 having a fitting boss 42a on the vehicle body forward side.

The fitting boss 42a is fitted into a connecting hole (not shown) in the center cover 2, which results in the side cover 4 being integrated with the center cover 2. The side wall surface 41 further has two fixing holes 45, 46 made at upper and lower positions away from the fitting boss 42a toward the vehicle body rearward side. Additionally, the edge portion 41a on the upper edge has a curved portion 41b that is curved to follow appropriately an outline of the down frame 16.

In the catalyst cover 1 formed by assembling the above-described center cover 2 and the side covers 3, 4, the air hole portions 21A, 21B are formed between the center cover 2 and the side cover 3 and between the center cover 2 and the side cover 4, respectively, as shown in FIGS. 2 to 4.

The exhaust system including the catalytic device 40 has front surface and left side surface portions covered in the catalyst cover 1.

Additionally, in this embodiment, an exhaust gas sensor 45 including an oxygen sensor disposed at the exhaust gas introducing section 39 is covered in a sensor cover portion 1a of the catalyst cover 1.

Tangents L in a wheel circumferential direction of a rear portion upper surface of a front fender member 15 are oriented toward the opening portion 20. This arrangement allows air flowing along a surface of the front fender member 15 to be effectively directed toward the opening portion 20 during the vehicle running.

The plug caps 35 on the ignition plugs disposed on the cylinder front surface are covered in the plug cover portion 1b of a portion of the catalyst cover 1 upward of the opening portion 20.

In addition, the catalyst cover 1 is formed to cover front and side surfaces of the radiator 51 and the radiator reservoir tank 48.

FIG. 19 shows a condition before the catalyst cover 1 having arrangements as described above is attached. The catalyst cover 1 is fixed in placed, on the left side thereof, by the mounting stay 60 attached to the plate-shaped engine hanger portion 17 on the lower end of the down frame 16 and a mounting stay 70 directly attached to the crankcase 30k.

It is noted that the catalyst cover 1 is fixed in placed, on the right side thereof, by the mounting stay 80 attached to the plate-shaped engine hanger portion 17 on the lower end of the down frame 16 and a mounting stay 90 directly attached to the crankcase 30k.

Figure 12:
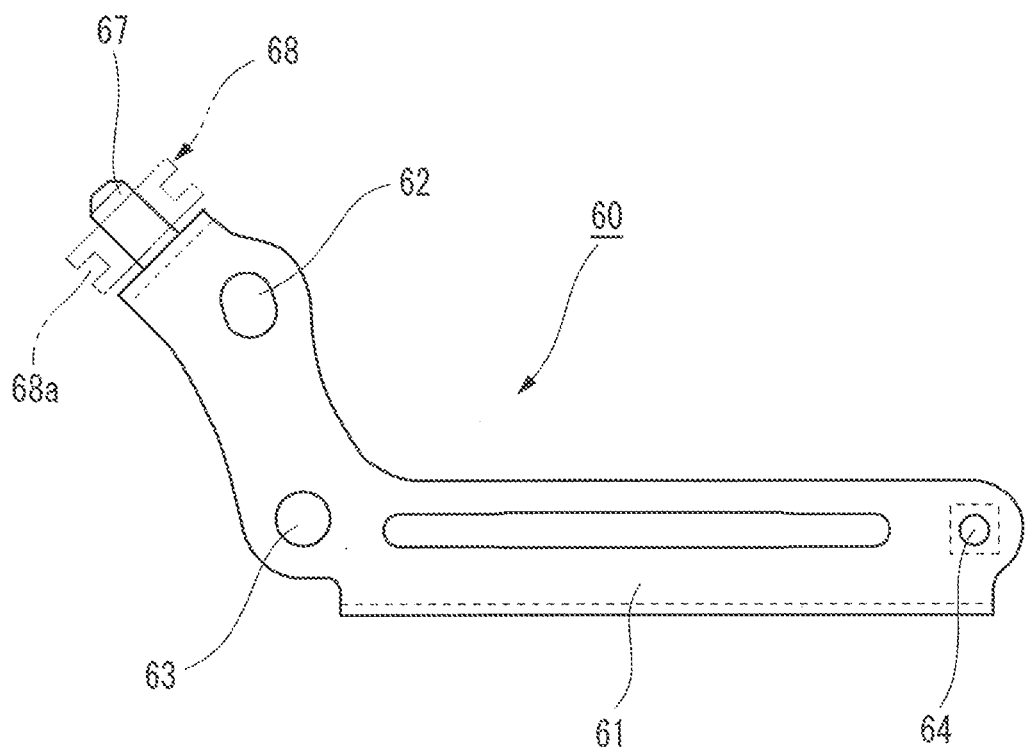
FIG. 12 is a side elevational view showing a mounting stay disposed on a forward side on the left side of the vehicle, on which the catalyst cover according to the embodiment of the present invention is mounted.
Figure 13:
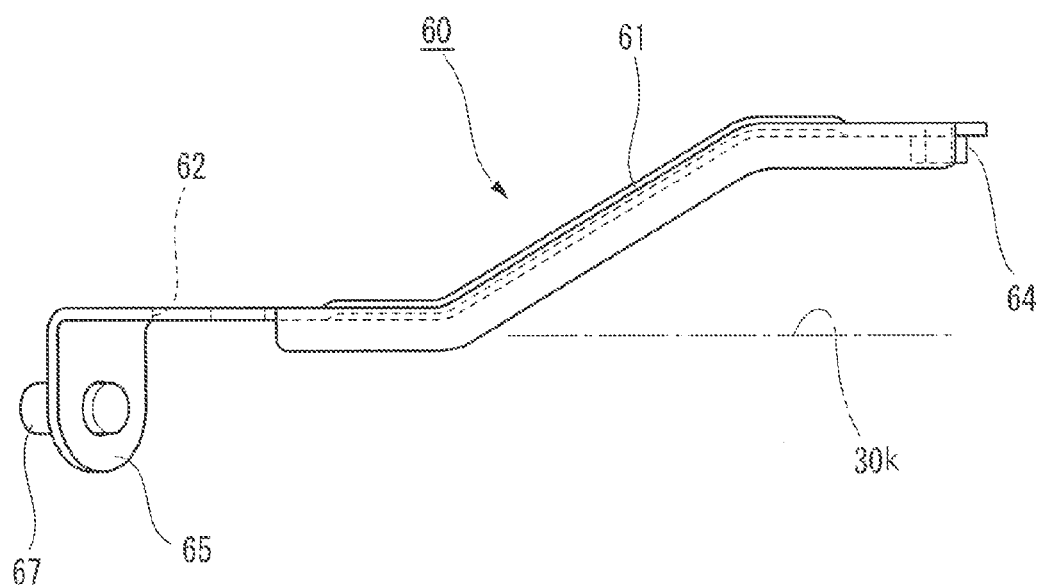
FIG. 13 is a plan view showing the mounting stay shown in FIG. 12, as viewed from a downward side of the vehicle.

Referring to FIGS. 12 and 13, the mounting stay 60 has fixing holes 62 and 63 and a screw receiving portion 64. The fixing holes 62 and 63 made on a first end side of a stay main unit 61 is substantially shaped like an inverted-L in a side view (see FIG. 12). The screw receiving portion 64, disposed on a second end side of the stay main unit 61, receives a screw for attaching the side cover 3 of the catalyst cover 1. The mounting stay 60 also includes a bent portion 65 disposed on the first end side of the stay main unit 61. The bent portion 65 is bent in the vehicle lateral direction from the stay main unit 61 in a condition in which the mounting stay 60 is installed in the vehicle. A holding pin 67 is placed in a standing condition in the bent portion 65.

A spacer 68 is mounted on the holding pin 67. An edge portion of the fixing hole 24e of the center cover 2 fits into a groove 68a in the spacer 68. The stay main unit 61 is bent appropriately such that, in an installed condition, the screw receiving portion 64 is away from an outer surface of the crankcase 30k as shown in FIG. 13.

It is noted that the mounting stay 60 is secured to the engine hanger portion 17 with fixing screws 19, 19.

Figure 14:
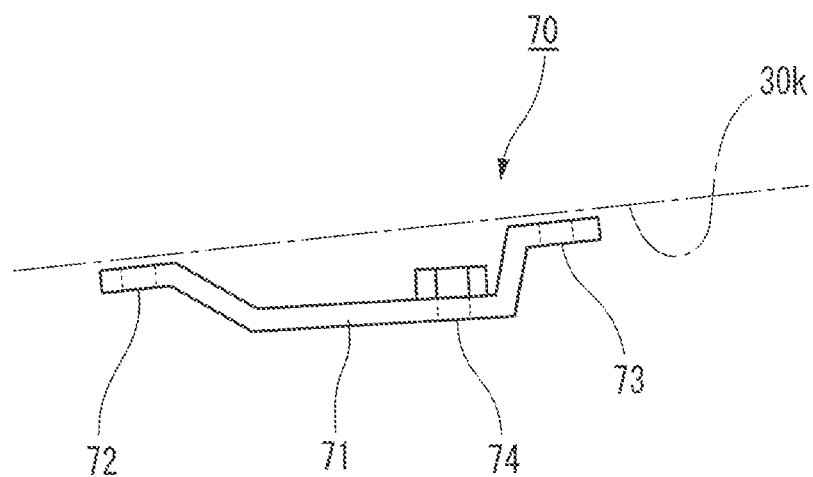
FIG. 14 is a plan view showing a mounting stay disposed on a rearward side on the left side of the vehicle, on which the catalyst cover according to the embodiment of the present invention is mounted.

Referring to FIGS. 14 and 19, the mounting stay 70 has fixing holes 72 and 73 made in either end sides of a stay main unit 71 that is mildly curved into an arch in a side view (see FIG. 19). In addition, referring to FIG. 14, the stay main unit 71 has an intermediate portion bent appropriately to be away from the outer surface of the crankcase 30k. The intermediate portion has a screw receiving portion 74 in which to attach a rear end portion of the side cover 3 of the catalyst cover 1. The mounting stay 70 is secured to the outer surface of the crankcase 30k via the fixing screws 19, 19.

Figure 15:
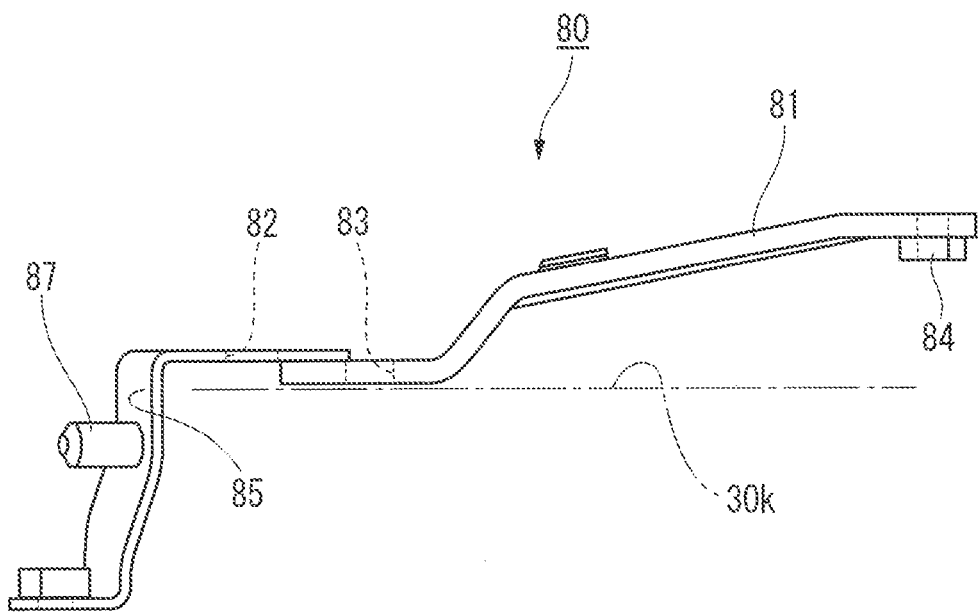
FIG. 15 is a plan view showing a mounting stay disposed on a forward side on the right side of the vehicle, on which the catalyst cover according to the embodiment of the present invention is mounted.
Figure 16:
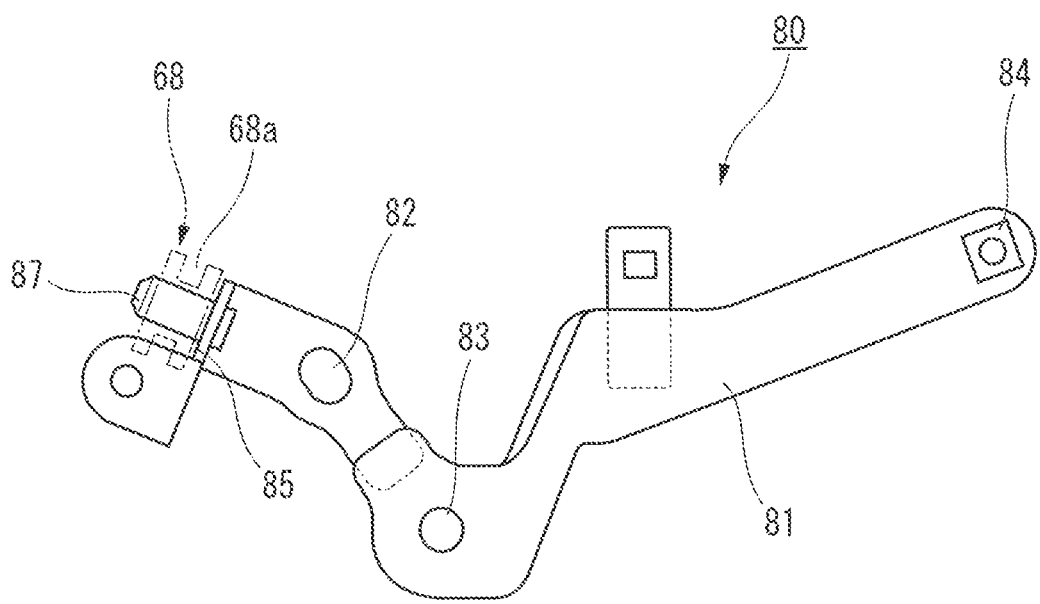
FIG. 16 is side elevational view showing the mounting stay shown in FIG. 15.

Referring to FIGS. 15 and 16, the mounting stay 80 has fixing holes 82 and 83 and a screw receiving portion 84. The fixing holes 82 and 83 are made on a side close to a first end side of a stay main unit 81. The screw receiving portion 84, disposed on a second end side of the stay main unit 81, receives a screw for attaching the side cover 4 of the catalyst cover 1. The mounting stay 80 also includes a bent portion 85 disposed on the first end side of the stay main unit 81. The bent portion 85 is bent in the vehicle lateral direction from the stay main unit 81 in a condition in which the mounting stay 80 is installed in the vehicle. A holding pin 87 is placed in a standing condition in the bent portion 85. The spacer 68 is mounted on the holding pin 87. The edge portion of the fixing hole 24e of the center cover 2 fits into the groove 68a in the spacer 68.

In addition, the stay main unit 81 is bent appropriately such that, in an installed condition, the screw receiving portion 84 is away from the outer surface of the crankcase 30k as shown in FIG. 15. Additionally, the mounting stay 80 is secured to the engine hanger portion 17 with the fixing screws 19, 19.

Figure 17:
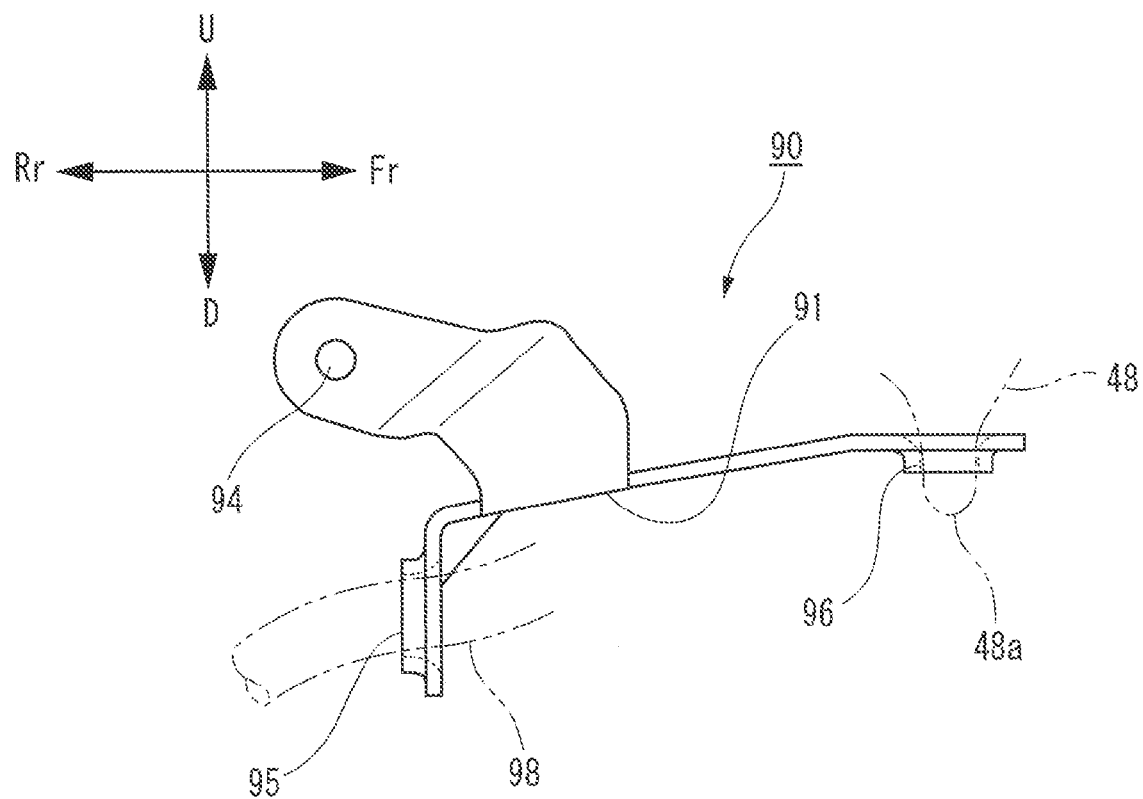
FIG. 17 is a side elevational view showing a mounting stay disposed on a rearward side on the right side of the vehicle, on which the catalyst cover according to the embodiment of the present invention is mounted.
Figure 18:
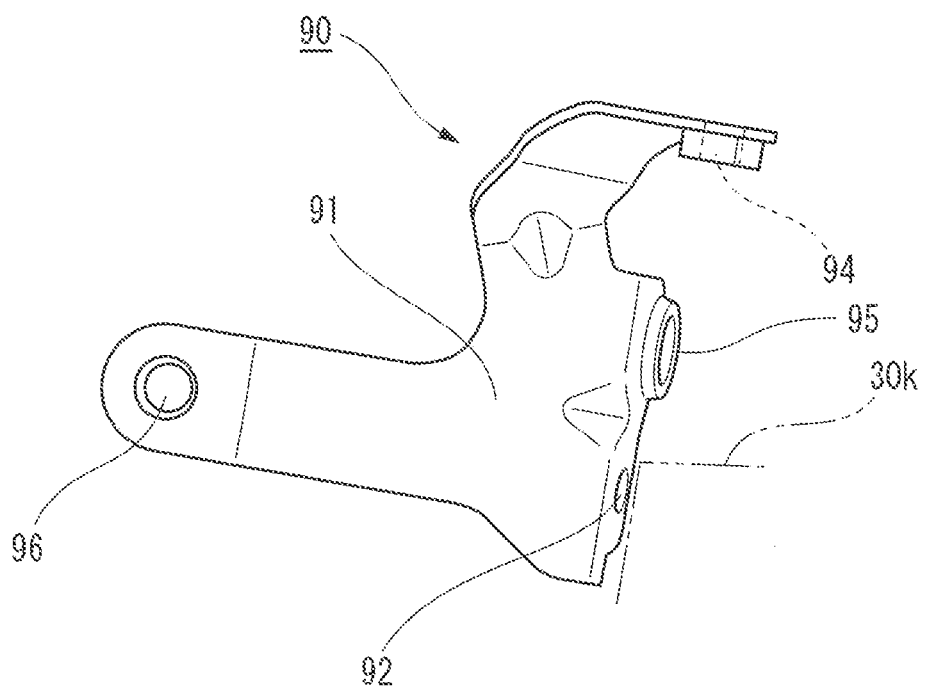
FIG. 18 is a perspective view showing the mounting stay shown in FIG. 17.

Referring to FIGS. 17 and 18, the mounting stay 90 includes a stay main unit 91. The stay main unit 91 is composed of three tabs protruding in three directions. The stay main unit 91 has a fixing hole 92 (see FIG. 18) made in one of these three tabs. A bolt (not shown) is installed in this fixing hole 92, so that the stay main unit 91 can be fixed to a forward lower end portion of the crankcase 30k. The stay main unit 91 is bent appropriately such that the screw receiving portion 94 for fixing the side cover 4 is away from the outer surface of the crankcase 30k.

The stay main unit 91 also has an engagement hole 96 in which to fit a lower end portion 48a of the radiator reservoir tank 48 and a pipe holding hole 95 made in another tab, in which to insert and hold a drain pipe 98.

The catalyst cover 1 may be mounted as follows. Specifically, for example, referring to FIG. 19 (showing only the left side of the vehicle), the above-described mounting stays 60, 70, 80, 90 are first mounted on the vehicle main body side. The center cover 2 is first mounted and then the side covers 3, 4 are assembled to the center cover 2. The fixing screws 19 are then threaded into the screw receiving portions 6474, 84 and 94 of the mounting stays 60, 70, 80 and 90, respectively.

Effects of the catalyst cover 1 in this embodiment will be described below.

The catalyst cover 1 of this embodiment includes the sensor cover portion 1a disposed on a side surface of the exhaust gas introducing section 39 as described above. The sensor cover portion 1a covers the exhaust gas sensor 45 from the forward direction. The catalyst cover 1 can therefore offer an effective protection against, for example, flying gravel during running. In addition, the ignition plugs (shown are the plug caps 35) on the cylinder front surface have their forward portions covered in, and protected by, the plug cover portion 1b. Should a condition develop during running in which the front forks 27 contract, the opening portion 20 at a most leading end portion of the catalyst cover 1 ensures a sufficient space from the front wheel WF.

The side cover 3 covers a side of the radiator reservoir tank 48 and the center cover 2 covers the radiator reservoir tank 48 from the forward direction. The radiator reservoir tank 48 can thereby be protected.

In addition, in this embodiment, the mounting stays 60 and 80 serving as catalyst cover stays are fastened to the plate-shaped engine hanger portions 17 of the vehicle body frame 11, so that load of the catalyst cover 1 may be borne by the engine hanger portions 17 and processing of the cylinder block surface can be minimized. Further, the catalyst cover 1 covers both the engine hanger portions 17 and the mounting stays 60 and 80 from sides, thereby masking both the engine hanger portions and the mounting stays to improve appearance.

The catalyst cover 1 of this embodiment has the opening portion 20 that opens such that the tangents L of the rear portion upper surface of the front fender member 15 disposed upwardly of the front wheel WF are oriented toward the opening portion 20. As shown in FIG. 2, therefore, while the vehicle is running, an air flow W1 flowing along the surface of the front fender member 15 flows effectively into the opening portion 20. The air flow W1 flowing in through the opening portion 20 swiftly flows through a gap between the catalyst cover 1 and the engine 30 and a gap between the catalytic device 40 and the engine 30. This prevents an engine heat from being stagnant in areas around the catalytic device 40.

Additionally, an air flow W2 flowing into the air hole portions 21A and 21B also swiftly flows through a gap between the side cover 3 and 4 and the engine 30 and a gap between the catalytic device 40 and the engine 30. A simple structure incorporating the side covers 3 and 4 therefore allows the engine heat to be discharged effectively.

The foregoing descriptions of the exemplary embodiment of the invention are not intended to be exhaustive or to limit the invention to the precise forms disclosed. For example, the catalyst cover 1 may be reshaped in an appropriate manner and the mounting stay may be reshaped or restructured in an appropriate manner.

According to the embodiment, a saddle riding vehicle includes a vehicle body frame, an engine, a catalytic device, and a catalyst cover. Specifically, the engine is disposed on the vehicle body frame and includes a cylinder block in a forwardly inclined position. The catalytic device is disposed at a front lower portion of the engine and includes: an exhaust gas introducing section oriented substantially at right angles; and a catalyst case disposed immediately below the exhaust gas introducing section. The catalyst cover is disposed on the vehicle body frame in a space between a front wheel held in place by a front fork at a side forward of the vehicle body frame and the catalytic device. The catalyst cover covers a front portion of the catalytic device from a front downward direction. In the saddle riding vehicle, the catalyst cover includes an opening portion at a portion forward of the exhaust gas introducing section.

In this embodiment, the catalyst cover for covering the front portion of the catalytic device from the front downward direction is disposed between the front wheel and the catalytic device for an exhaust gas from the engine and the catalyst cover includes the opening portion disposed at a position forward of the exhaust gas introducing section. In a protruding structure including the exhaust gas introducing section that is oriented substantially at right angles at the front surface lower portion of the forwardly inclined cylinder, a clearance between the front wheel and an under guard can be easily achieved, while a sufficient protection can be provided for the catalytic device, an exhaust system, and parts therearound.

In the embodiment, the saddle riding vehicle further includes a front fender member disposed upwardly of the front wheel. A tangent in a wheel circumferential direction of a rear portion upper surface of the front fender member is oriented toward the opening portion.

In this embodiment, the tangent in the wheel circumferential direction of the rear portion upper surface of the front fender member is oriented toward the opening portion. Air flowing along a surface of the front fender member can therefore be effectively directed toward the opening portion while the vehicle is running. This prevents an engine heat from being stagnant in areas around the catalytic device.

In the embodiment, an exhaust gas sensor is disposed on a side surface of the exhaust gas introducing section; and the catalyst cover composes a sensor cover portion that is a side portion of the opening portion for covering the exhaust gas sensor from a forward direction.

In this embodiment, the catalyst cover includes the sensor cover portion that is a side portion of the opening portion for covering the exhaust gas sensor from a forward direction. An oxygen sensor disposed at the exhaust gas introducing section is therefore protected by the catalyst cover at the side portion of the opening portion.

In the embodiment, the cylinder block includes an ignition plug disposed on a front surface thereof; and the catalyst cover includes a plug cover portion composing an upper portion of the opening portion for covering a forward area of the ignition plug.

In this embodiment, the ignition plug disposed on the cylinder front surface is also covered in the catalyst cover at the upward portion of the opening portion. This eliminates the need for a separate plug cover structure.

In the embodiment, the catalyst cover includes three parts which are a center cover and a pair of left and right side covers assembled together. The center cover and the side cover form an air hole portion therebetween.

In this embodiment, the catalyst cover is formed to include three parts, that is, the center cover, and a pair of the left and right side covers assembled together. Thus, even if the catalyst cover is shaped relatively complicatedly so as to cover the engine and its peripheral parts, the catalyst cover can be produced and assembled easily.

In addition, the air hole portions can be formed by assembling the center cover and the side covers. This simplifies a structure of each part and effectively discharge the engine heat around the catalytic device.

In the embodiment, either one of the side covers of the catalyst cover covers a side of a radiator reservoir tank for storing coolant for the engine.

In this embodiment, the catalyst cover is formed so as to cover the radiator reservoir tank that stores coolant for the engine. The reservoir tank can thereby be protected.

In the embodiment, the vehicle body frame includes plate-shaped engine hanger portions disposed at a portion to which the engine is fastened; catalyst cover stays on which to attach the catalyst cover are fastened to the engine hanger portions; and the catalyst cover covers both the engine hanger portions and the catalyst cover stays from sides.

In this embodiment, the catalyst cover is formed so as to cover both the engine hanger portions and the catalyst cover stays from sides. The plate-shaped surface of the engine hanger portions can therefore be used to let the vehicle body frame directly bear load of the catalyst cover. Further, the engine hanger portions and the mounting stays can be hidden behind the catalyst cover.

Obviously, numerous modifications and variations of the present invention are possible in light of the above teachings. It is therefore to be understood that within the scope of the appended claims, the invention may be practiced otherwise than as specifically described herein.

What is claimed is:

1. A saddle riding vehicle comprising:
    a vehicle body frame;
    an engine disposed on the vehicle body frame and including a cylinder block in a forwardly inclined position;
    a catalytic device disposed at a front lower portion of the engine, the catalytic device comprising:
        an exhaust gas introducer oriented substantially at right angles; and
        a catalyst case disposed below the exhaust gas introducer; and
    a catalyst cover disposed on the vehicle body frame to cover a front portion of the catalytic device from a front downward direction, the catalyst cover being provided in a space between the catalytic device and a front wheel supported by a front fork provided at a front side of the vehicle body frame, the catalyst cover including an opening portion at a forward portion of the exhaust gas introducer,
    wherein an opening width of the opening portion in the catalyst cover along a width direction of the vehicle is smaller than a widest dimension of the front wheel along the width direction,
    wherein the catalyst cover includes a center cover and a pair of left and right side covers assembled together,
    wherein a first air hole portion is provided between the center cover and the left side cover,
    wherein a second air hole portion between the center cover and the right side cover, and
    wherein an upper end of the opening portion is disposed above an upper end of the first air hole portion and an upper end of the second air hole portion.

2. The saddle riding vehicle according to claim 1, further comprising:
    a front fender member disposed upwardly of the front wheel, wherein
    a tangent in a wheel circumferential direction of a rear portion upper surface of the front fender member is oriented toward the opening portion.

3. The saddle riding vehicle according to claim 1, further comprising:
    an exhaust gas sensor disposed on a side surface of the exhaust gas introducer, wherein
    the catalyst cover includes a sensor cover portion to cover the exhaust gas sensor from a forward direction, the sensor cover portion providing a side portion of the opening portion.

4. The saddle riding vehicle according to claim 1, wherein
    the cylinder block includes an ignition plug disposed on a front surface of the cylinder block, and
    the catalyst cover includes a plug cover portion to cover a forward area of the ignition plug, the plug cover portion providing an upper portion of the opening portion.

5. The saddle riding vehicle according to claim 1, further comprising:
    a radiator reservoir tank to store coolant for the engine, wherein either one of the left and right side covers of the catalyst cover covers a side of the radiator reservoir tank.

6. The saddle riding vehicle according to claim 1, further comprising:
catalyst cover stays to which the catalyst cover is attached, the catalyst cover stays being respectively fastened to the engine hanger portions, wherein
the vehicle body frame includes plate-shaped engine hanger portions disposed at a portion to which the engine is fastened to the vehicle body frame, and
the catalyst cover covers both the engine hanger portions and the catalyst cover stays from sides.

7. The saddle riding vehicle according to claim 1, wherein the center cover includes the opening portion.

* * * * *